No. 735,859. PATENTED AUG. 11, 1903.
W. COOPER.
POWER TRANSMITTING MECHANISM.
APPLICATION FILED SEPT. 9, 1902.
NO MODEL.
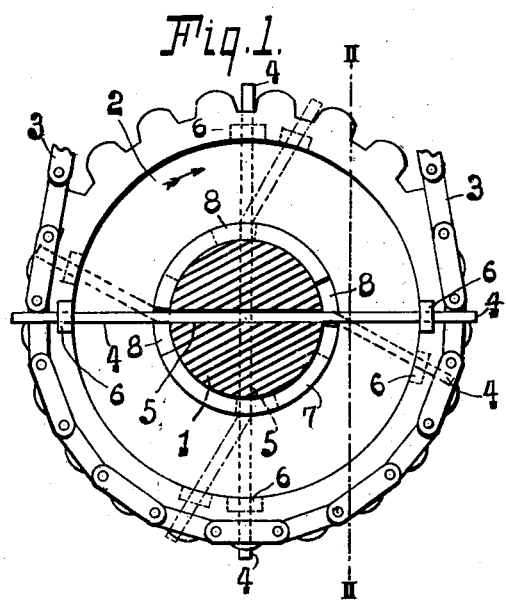
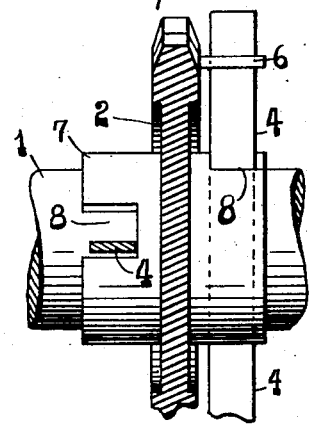
WITNESSES:
Charles G. Beale.
M. L. Avord.
William Cooper
INVENTOR,
by Edward A. Lawrence
his attorney No. 735,859. Patented August 11, 1903.

UNITED STATES PATENT OFFICE.

WILLIAM COOPER, OF DENVER, COLORADO.

POWER-TRANSMITTING MECHANISM.

SPECIFICATION forming part of Letters Patent No. 735,859, dated August 11, 1903.

Application filed September 9, 1902. Serial No. 122,648. (No model.)

*To all whom it may concern:*

Be it known that I, WILLIAM COOPER, a citizen of the United States of America, and a resident of the city of Denver, county of Arapahoe, and State of Colorado, have invented certain new and useful Improvements in Power-Transmitting Mechanism, of which the following is a specification.

In the accompanying drawings, which make part of this specification, Figure 1 is an elevation of a sprocket-wheel embodying my invention, and Fig. 2 is a sectional view of the same along the line II II in Fig. 1 looking toward the right.

My invention, generally speaking, consists of a power-wheel, be it a sprocket wheel, pulley, or gear, connected to the shaft upon which it is mounted and to which it is to communicate power by means of spring mechanism described below. Said power-wheel is itself connected to the source of power by a belt, chain, or intermeshing teeth, as the case may be. In the use of these means for the transmission of power a certain amount of "play" or looseness of parts must be provided to avoid binding or unnecessary friction, and this frequently results in a jar or jolt when the mechanism is started or stopped. This "lost motion" is present in excess where the relative distance between two pulleys or sprockets connected by belt or chain or between intermeshing gears varies, so that the belt or chain becomes looser or the teeth of the gears mesh less intimately with each other. In the case of power-driven vehicles, such as automobiles and locomobiles, the body of the vehicle on which the motor is mounted is supported on springs upon the axles of the vehicle, to which power to rotate the driving-wheels is communicated. As the action of the springs varies the distance between the vehicle-body and the axles, owing to the load carried or the unevenness of the road-surface, the driving-chain would at times become very loose, producing a great deal of lost motion, so that the starting of the vehicle would cause severe jarring and jolting to the delicate mechanism of the vehicle and great annoyance and discomfort to the occupants. This jarring I prevent by incorporating a spring device between the driving-axle and the sprocket mounted thereon or the pulley or gear, whichever may be the case, by means of which power is communicated to the driving-axle.

The following is a detailed description of my invention, reference being had to the drawings.

1 is the driving-axle of an automobile or other mechanism to be operated. 2 is a sprocket-wheel loosely mounted thereon, and 3 is a power-chain running from a corresponding sprocket on the motor or source of power, by means of which sprocket 2 is rotated.

4 4 are bars, made of spring metal, passing through seats 5 5 in axle 1 and having their extremities engaged by eye-standards 6 6 on wheel 2. In the drawings I have shown two spring-bars, one on each side of the wheel and at right angles to each other; but, if desired, two or more may be placed on each side of the wheel.

7 is the hub, made integral with wheel 2 and having recesses 8 8 cut into its edges, through which recesses pass bars 4 4, these recesses being so arranged that sprocket 2 is enabled to rotate forward through a small arc without the shanks of bars 4 4 impinging against the extremities of recesses 8 8, the standards 6 6 being so located on wheel 2 that when said wheel is at rest the forward extremities of recesses 8 8—that is, the extremities in the direction of the arrow—bear against the shanks of bars 4 4.

The operation of my device is as follows: Power is applied to rotate sprocket-wheel 2 by means of chain 3 in the forward direction, (indicated by the arrow.) If wheel 2 were a sprocket of the usual design rigidly mounted on axle 1, the taking up of the lost motion would result in a jar or jolt to the whole mechanism; but my wheel being loosely mounted on axle 1 rotates independently, except that the spring-bars seated in said axle and attached at their extremities to wheel 2 bend in the direction of rotation until their resistance is sufficient to overcome the inertia of axle 1 and force said axle to revolve, the springs assuming the bent position illustrated by dotted lines in Fig. 1. Thus sprocket 2 rotates axle 1 through the resistance of spring-bars attached to both axle and sprocket. It readily appears that the springs 4 4 would receive and effectually take up and eliminate the usual jolt or jar arising from lost motion, so that the mechanism may be started smoothly and easily. In backing or rotating the sprocket in a direction opposite to the arrow the forward extremities of recesses 8 8 would at once bear against the shanks of spring-bars 4 4, and thus impart the rotary motion to the axle. If desired, the recesses may be so arranged that when the sprocket is at rest the spring-bars would be intermediate of the extremities of the recesses, so that in backing the forward extremities of the recesses would not bear against the shanks of the spring-bars, but the same action of the springs upon the axle would occur, but in the reverse direction.

I have particularly illustrated my invention in relation to sprocket-wheels connected by a chain; but its application to use with pulleys and belt is evident, the pulley mounted on the mechanism to which the power is to be delivered being fitted with my spring mechanism between itself and the axle on which it is mounted. In the case of the transmission of power by means of intermeshing gear I apply my invention by mounting the gear-wheel, having the relative position of sprocket-wheel 2, loosely on the shaft or axle and providing it with my spring connection therewith, whereby all the jarring and jolting arising from lost motion is taken up.

It will readily be seen from the above that my invention effectually disposes of the evil results of lost motion in the transmission of power and enables the smooth operation of such mechanism to be accomplished. It is sometimes noticed that where a sprocket-chain is very loose or the intermeshing gears too far apart a continual jarring results from the lost motion in operation. By use of my invention the loosening of the chain or separating of the intermeshing gears will not be attended with such jarring.

My invention is especially applicable to automobiles and power-driven vehicles in general, but is equally useful with all forms of power where the same is transmitted from a source to destination.

I have described my invention with great minuteness to more clearly illustrate the same, but do not wish to limit myself thereby; but

I claim broadly—

In power transmission, the combination of a shaft; a power-wheel loosely mounted on said shaft and operatively connected with the source of power; seats in said shaft, and spring-bars passing through said seats and attached at their extremities to said wheel.

Signed by me at Denver, Colorado, this 30th day of July, 1902.

WILLIAM COOPER.

Witnesses:
M. H. O'BRIEN,
MARY JONES.